(12) United States Patent
Schmidt et al.

(10) Patent No.: US 11,261,767 B2
(45) Date of Patent: Mar. 1, 2022

(54) BIFURCATED AIR INDUCTION SYSTEM FOR TURBOCHARGED ENGINES

(71) Applicants: Michael P Schmidt, Highland, MI (US); Brian J Jacobs, Romeo, MI (US); Joseph Swineford, Grand Blanc, MI (US)

(72) Inventors: Michael P Schmidt, Highland, MI (US); Brian J Jacobs, Romeo, MI (US); Joseph Swineford, Grand Blanc, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/094,347

(22) Filed: Nov. 10, 2020

(65) Prior Publication Data

US 2021/0140353 A1  May 13, 2021

Related U.S. Application Data

(60) Provisional application No. 62/934,292, filed on Nov. 12, 2019.

(51) Int. Cl.
*F01M 13/02* (2006.01)
*F02M 35/10* (2006.01)

(52) U.S. Cl.
CPC .... *F01M 13/025* (2013.01); *F02M 35/10091* (2013.01); *F02M 35/10144* (2013.01); *F02M 35/10222* (2013.01); *F02M 35/10229* (2013.01); *F01M 2013/027* (2013.01)

(58) Field of Classification Search
CPC .......... F01M 13/025; F01M 2013/027; F02M 35/10091; F02M 35/10144; F02M 35/10229; F02M 35/10236; F02M 35/10242; F02M 35/10262; F02M 35/10308; F02M 35/10209; F02M 35/10222
See application file for complete search history.

(56) References Cited

U.S. PATENT DOCUMENTS

| | | | |
|---|---|---|---|
| 5,975,845 | A | 11/1999 | Ball |
| 7,189,052 | B2 | 3/2007 | Jones |
| 8,880,320 | B2 | 11/2014 | Panciroli |
| 9,200,639 | B2 | 12/2015 | Li et al. |
| 10,662,949 | B2 | 5/2020 | Arnold |
| 2002/0012586 | A1 | 1/2002 | Nikpour |
| 2005/0056014 | A1 | 3/2005 | Arnold et al. |

(Continued)

*Primary Examiner* — Jacob M Amick
(74) *Attorney, Agent, or Firm* — Ralph E. Smith

(57) ABSTRACT

An air induction system for a vehicle includes a turbocharger having a compressor side inlet and a bifurcated clean air intake system having a bifurcated conduit. The bifurcated conduit includes an upstream end configured to receive intake air, a downstream end configured to supply intake air to the compressor side inlet, an inner passage configured to supply intake air to the downstream end, and an outer passage disposed about the inner passage and separated from the inner passage by an inner wall, the outer passage configured to selectively receive recirculation backflow from the compressor side inlet. A port is fluidly coupled between the outer passage and another location of the vehicle. The port is configured to selectively evacuate at least a portion of the recirculation backflow to the another location the vehicle.

14 Claims, 5 Drawing Sheets

(56) References Cited

U.S. PATENT DOCUMENTS

| | | |
|---|---|---|
| 2007/0137201 A1 | 6/2007 | Arnold et al. |
| 2010/0005799 A1 | 1/2010 | Nikpour |
| 2012/0294703 A1 | 11/2012 | Lei et al. |
| 2016/0090948 A1 | 3/2016 | Svihla et al. |
| 2017/0370361 A1* | 12/2017 | Arnold .................... F04D 17/10 |

* cited by examiner

BIFURCATED AIR INDUCTION SYSTEM FOR TURBOCHARGED ENGINES

CROSS REFERENCE TO RELATED APPLICATION

This application claims the benefit of U.S. Provisional Patent Application No. 62/934,292 filed Nov. 12, 2019, the contents of which are incorporated herein by reference thereto.

FIELD

The present application relates generally to turbocharged engines and, more particularly, to a bifurcated air intake incorporated into a turbocharger system.

BACKGROUND

In some conventional turbocharger systems, the maximum flow of a compressor design is determined by a throat area of an inducer. As the inducer flow area is increased relative to a maximum diameter of the compressor wheel, maximum efficiency is reduced. To improve flow range of a fixed diameter compressor, it is desirable to move a "surge line" to a lower flow. However, high turbocharger compressor inlet temperatures can cause a reduction in turbocharger efficiency at low mass flows. Further, in such conventional turbocharger systems, transition from naturally aspirated conditions to charged conditions can cause hot recirculation gases to backflow up the intake air duct, thereby causing thermal contamination to inflowing air and reducing efficiency. Therefore, while such conventional systems do work well for their intended purpose, there remains a desire for improvement in the relevant art.

SUMMARY

In accordance with one example aspect of the application, an air induction system for a vehicle is provided. In one example implementation, the system includes a turbocharger having a compressor side inlet and a bifurcated clean air intake system having a bifurcated conduit. The bifurcated conduit includes an upstream end configured to receive intake air, a downstream end configured to supply intake air to the compressor side inlet, an inner passage configured to supply intake air to the downstream end, and an outer passage disposed about the inner passage and separated from the inner passage by an inner wall, the outer passage configured to selectively receive recirculation backflow from the compressor side inlet. A port is fluidly coupled between the outer passage and another location of the vehicle. The port is configured to selectively evacuate at least a portion of the recirculation backflow to the another location the vehicle.

In addition to the foregoing, the described air induction system may include one or more of the following features: wherein the another location of the vehicle is a crank case of the engine, such that the port is configured to selectively evacuate the recirculation backflow into the crank case; wherein the another location of the vehicle is a valve cover of the engine, such that the port is configured to selectively evacuate the recirculation backflow into the valve cover; and wherein the upstream end is fluidly coupled to a clean air box such that both the inner passage and the outer passage are fluidly coupled to the clean air box.

In addition to the foregoing, the described air induction system may include one or more of the following features: wherein the clean air box is a single clean air box; wherein a first portion of the recirculation backflow is directed to the another location of the vehicle, and a second portion of the recirculation backflow is directed back to the clean air box for mixture with the intake air; and wherein during a low flow, low boost operating condition, a first portion of intake air is directed into the compressor side inlet, a second portion of intake air is the recirculation backflow and directed through the outer passage and through the port.

In addition to the foregoing, the described air induction system may include one or more of the following features: wherein during at least one of a low flow, high boost condition and a high flow, high boost condition, the intake air is directed through the inner passage into the compressor side inlet, and a flow of crankcase air is drawn through the port, into the outer passage, and subsequently supplied to the compressor side inlet; wherein intake air is also drawn through the outer passage, mixes with the flow of crankcase air, and is supplied to the compressor inlet side; wherein during a high flow, low boost condition, a first portion of intake air is directed through the inner passage into the compressor side inlet, a second portion of intake air is directed through the outer passage into the port, and a third portion of intake air is directed through the outer passage to the compressor side inlet; and one or more heat exchangers thermally coupled to the conduit and configured to cool recirculation backflow passing through the outer passage.

In accordance with another example aspect of the application, an air induction system for a vehicle is provided. In one example implementation, the system includes a turbocharger having a compressor side inlet, a clean air box, and a bifurcated clean air intake system having a bifurcated conduit fluidly coupled between the turbocharger and the clean air box. The bifurcated conduit includes an upstream end configured to receive intake air from the clean air box, a downstream end configured to supply intake air to the compressor side inlet, and an inner passage configured to supply intake air to the downstream end. An outer passage is disposed about the inner passage and separated from the inner passage by an inner wall, the outer passage configured to selectively receive recirculation backflow from the compressor side inlet. The outer passage is fluidly coupled to the clean air box and configured to selectively provide at least a portion of the recirculation backflow to the clean air box for mixing with the intake air.

In addition to the foregoing, the described air induction system may include one or more of the following features: wherein the inner passage and the outer passage have non-equivalent lengths within the clean air box to reduce mixing of the recirculation backflow and the fresh intake air to reduce thermal contamination thereof; wherein the bifurcated clean air intake system further includes a port fluidly coupled between the outer passage and another location of the vehicle, wherein the port is configured to selectively provide at least a portion of the recirculation backflow to the another location of the vehicle; and wherein the recirculation backflow is sealed within the engine system and not exhausted therefrom for compliance with emissions requirements.

In accordance with another example aspect of the application, an air induction system for a vehicle is provided. In one example implementation, the system includes a turbocharger having a compressor side inlet, a clean air box, and a bifurcated clean air intake system having a bifurcated conduit fluidly coupled between the turbocharger and the clean air box. The bifurcated conduit includes an upstream end configured to receive intake air from the clean air box, a downstream end configured to supply intake air to the compressor side inlet, and an inner passage configured to supply intake air to the downstream end. An outer passage is disposed about the inner passage and separated from the inner passage by an inner wall, the outer passage configured to selectively receive recirculation backflow from the compressor side inlet. A port is fluidly coupled between the outer passage and at least one of a crankcase and a valve cover of the engine, wherein the port is configured to selectively provide at least a portion of the recirculation backflow to the crankcase and/or the valve cover. The outer passage is fluidly coupled to the clean air box and configured to selectively provide at least a portion of the recirculation backflow to the clean air box for mixing with the intake air.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

According to the principles of the present application, systems and methods for a turbocharger system with a bifurcated inlet are provided. The bifurcated inlet is incorporated into a clean air intake and is configured to reduce compressor inlet temperature at low mass flow, thereby moving the surge line, increasing the compressor flow versus pressure ratio map, and increasing efficiency.

In one example, the turbocharger system includes an EVAP compliant, fully integrated bifurcated clean air intake system that includes resonators, fuel purge, make-up air (MUA), crankcase ventilation (CCV), and air temperature sensors in a predetermined proximity to the turbocharger compressor wheel. The clean air intake system utilizes a CCV or MUA port to evacuate hot surging air into the engine dead space (e.g., crankcase or valve cover) to thereby (i) widen the turbocharger compressor map (increasing low flow compressor efficiency via lower inlet temps), and (ii) utilize the hot recirculation backflow to warm the valve cover and crankcase, which can prevent MUA to AIS icing, and expedite engine warmup, increasing efficiency and promoting tailpipe emission reduction. This also provides a way to reject heat from the clean air duct without requiring a low temp heat exchanger. In addition, the MUA is connected to the outlet duct.

In some examples, the bifurcated clean air intake system has non-equivalent tube lengths configured to allow fresh, inner tube flow to resist heat contamination by recirculation backflow that is flowing back into the clean airbox. Hot compressor recirculation backflow that is bifurcated is eventually reintroduced as incoming flow to the compressor wheel. In some cases, if the hot recirculation backflow does not cool down enough before being introduced, it can detract or negate one or more benefits of the bifurcation. As such, in some example embodiments, the bifurcated clean air intake system is configured to reject heat from the clean air duct without requiring low temperature coolant or refrigerant based heat exchangers.

Figure 1:
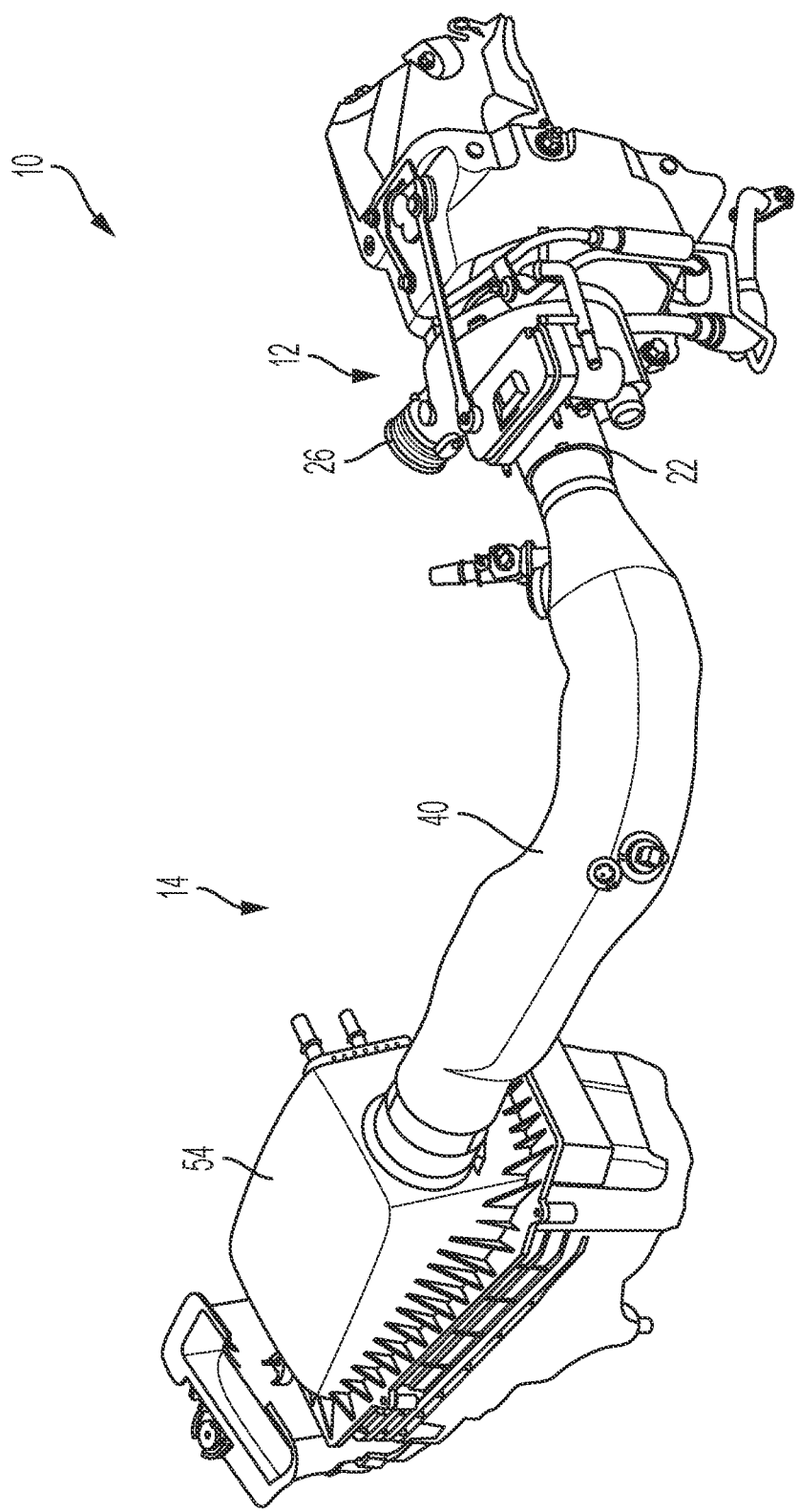
FIG. 1 is a perspective view of an example turbocharger system in accordance with the principles of the present application.
Figure 2:
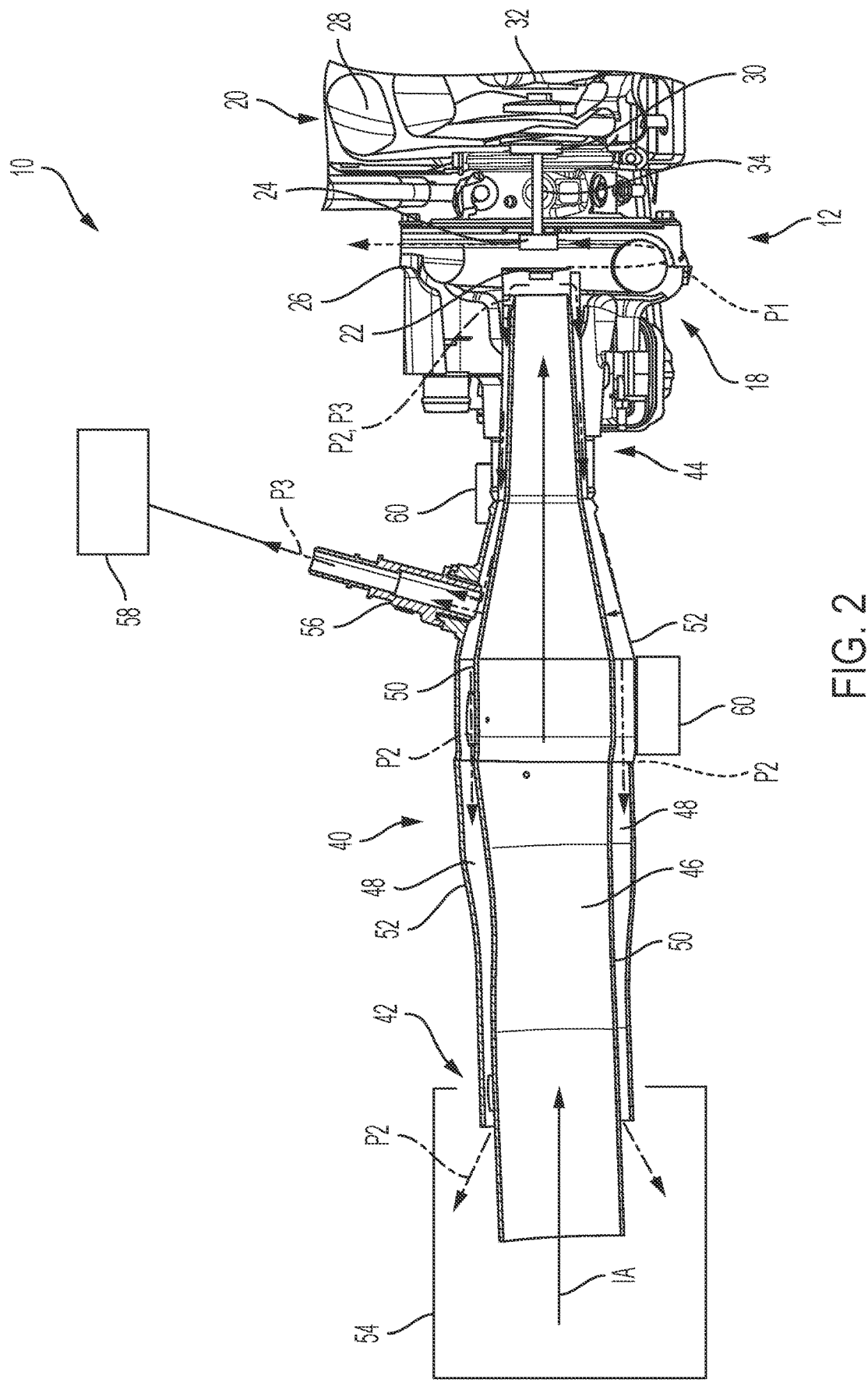
FIG. 2 is a sectional view of the turbocharger system of FIG. 1, in accordance with the principles of the present application.

With reference to FIGS. 1 and 2, an example air induction system 10 is illustrated. In the example embodiment, the air induction system 10 generally includes a turbocharger assembly 12 and a bifurcated clean air intake system 14. As shown in FIG. 2, the turbocharger assembly 12 generally includes a housing 16 having a compressor side 18 and a turbine side 20. The compressor side 18 includes an air inlet 22, a compressor wheel 24 configured to compress inlet air, and an air outlet 26. The turbine side 20 includes an exhaust inlet 28, a turbine wheel 30, and an exhaust outlet 32. The turbine wheel 30 is rotatably connected to the compressor wheel 24 via a shaft 34 and is configured to be rotated by incoming exhaust to thereby rotate the compressor wheel 24 to compress incoming inlet air.

In the example embodiment, the bifurcated clean air intake system 14 generally includes a bifurcated conduit 40 having an upstream end 42 and a downstream end 44. The bifurcated conduit 40 includes an inner passage 46 and an outer passage 48 at least partially defined by an inner wall 50 and an outer wall 52 such that outer passage 48 is disposed about the inner passage 46, for example, concentrically or substantially concentrically. The conduit upstream end 42 is fluidly coupled to a post-filter clean air box 54, and the conduit downstream end 44 is fluidly coupled to the turbocharger air inlet 22. As described herein in more detail, a port 56 (e.g., MUA or CCV port) is fluidly coupled to the outer passage 48 and is configured to supply intake air and/or recirculation backflow to an area 58 of the engine such as, for example, the crankcase or valve cover.

With continued reference to FIG. 2, in one example operation, intake air 'IA' enters the clean air box 54 and is supplied through the inner passage 46 toward the compressor 18. A first portion 'P1' of the intake air enters the compressor air inlet 22, while a second portion 'P2' of the intake air (e.g., recirculation backflow) enters the outer passage 48 and is directed back toward the clean air box 54. A third portion 'P3' of the intake air is directed through the port 56 and supplied to area 58. Advantageously, the recirculation backflow is sealed within the system and is not exhausted therefrom, thereby enabling compliance with EVAP requirements.

In the example embodiment, one or more heat exchangers 60 are thermally coupled to the bifurcated conduit 40 and configured to cool the recirculation backflow 'P2' and/or 'P3'. Heat exchangers 60 may be cooled by a coolant fluid such as, for example, air or refrigerant, and may be thermally coupled to one or more thermal systems of the vehicle or engine. Additionally, in the clean air box 54, the bifurcated conduit 40 has non-equivalent lengths, as shown by inner wall 50 having a longer length than outer wall 52. Such an arrangement advantageously facilitates preventing heat contamination of incoming fresh intake air by forcing the recirculated recirculation backflow along a longer path before mixing with the fresh air.

Figure 3:
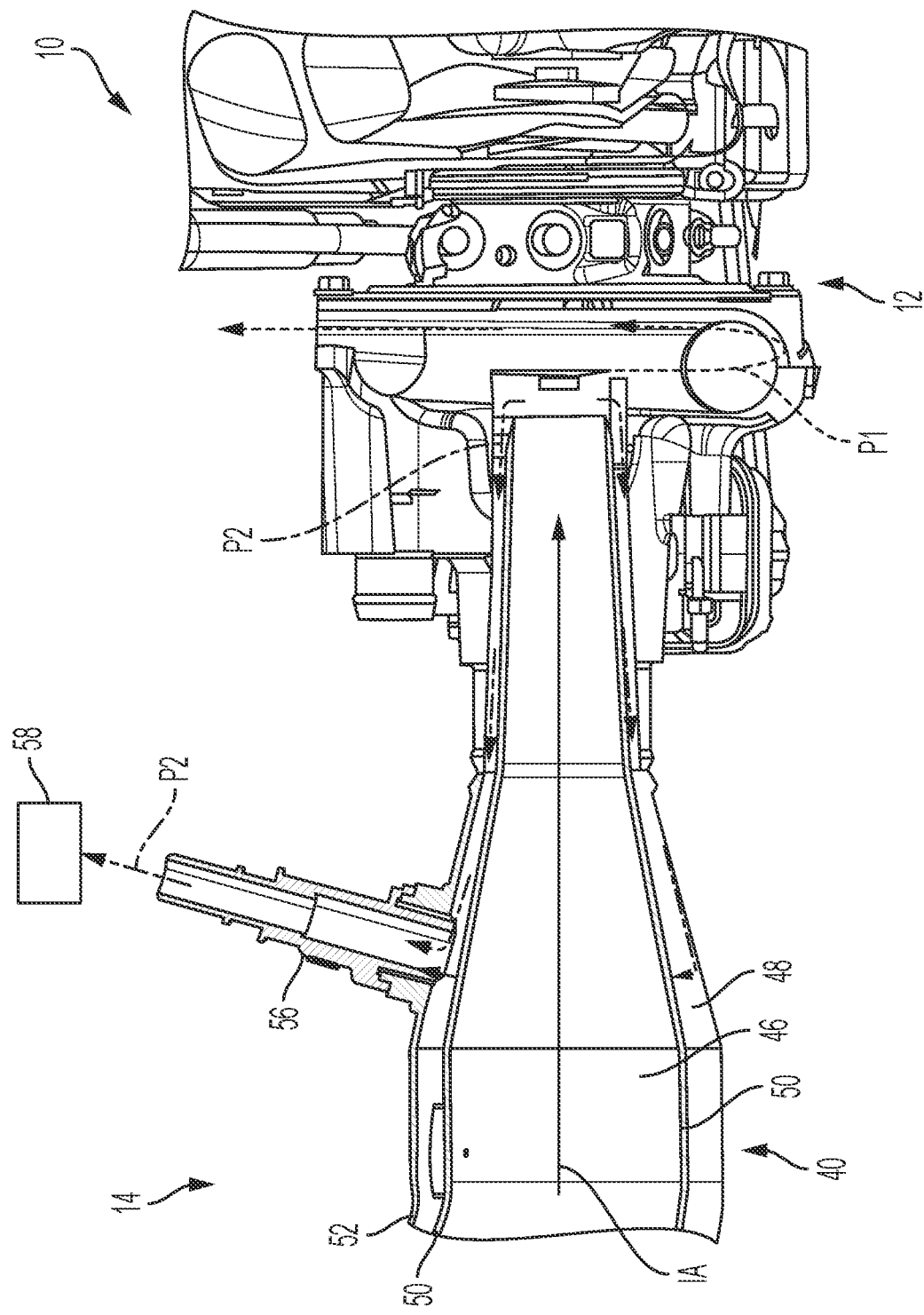
FIG. 3 is a sectional view of the turbocharger system shown in FIG. 2 during a low flow, low boost condition, in accordance with the principles of the present application.

With reference now to FIG. 3, one example operation of air induction system 10 in a low flow, low boost condition is illustrated. Intake air 'IA' enters the clean air box 54 and is drawn through the inner passage 46 and a first portion 'P1' is drawn toward the compressor inlet 22. As recirculation backflow occurs, a second portion 'P2' of the intake air flow reverses back toward the clean air box 54 through the outer passage 48. This hot recirculation backflow 'P2' is drawn from the outer passage 48, through the port 56, and supplied to area 58, for example as MUA.

Figure 4:
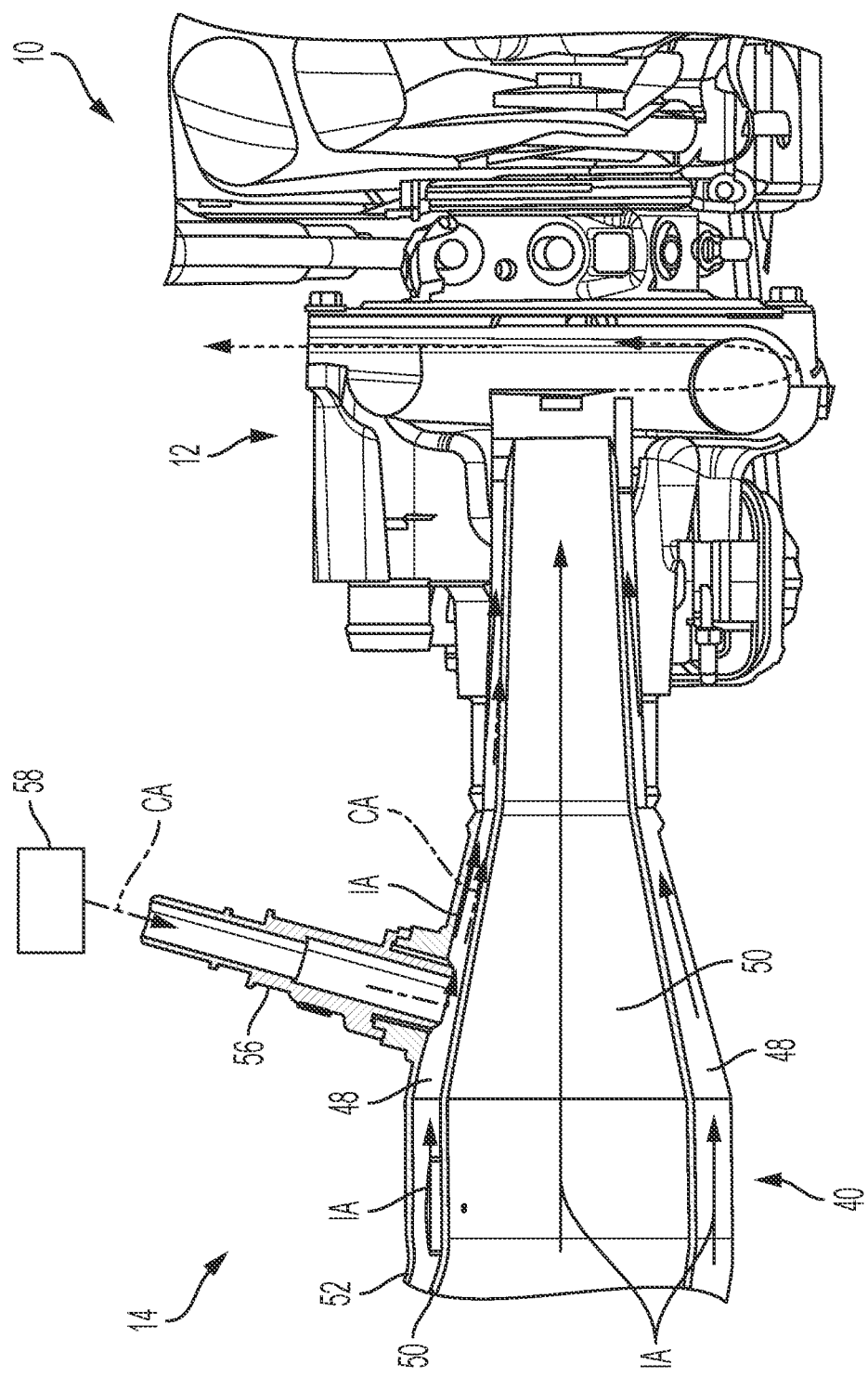
FIG. 4 is a sectional view the turbocharger system shown in FIG. 2 during a low flow, high boost condition and a high flow, high boost condition, in accordance with the principles of the present application.

With reference now to FIG. 4, one example operation of air induction system 10 in a low flow, high boost condition and a high flow, high boost condition is illustrated. Intake air 'IA' enters the clean air box 54 and is drawn through both the inner passage 46 and the outer passage 48 toward the compressor inlet 22. Crankcase air 'CA' is also drawn into the outer passage 48 via the port 56 and is subsequently supplied to the compressor inlet 22. This warmed crankcase air is configured to heat the intake air 'IA' and/or the bifurcated conduit 40 to reduce or prevent icing.

Figure 5:
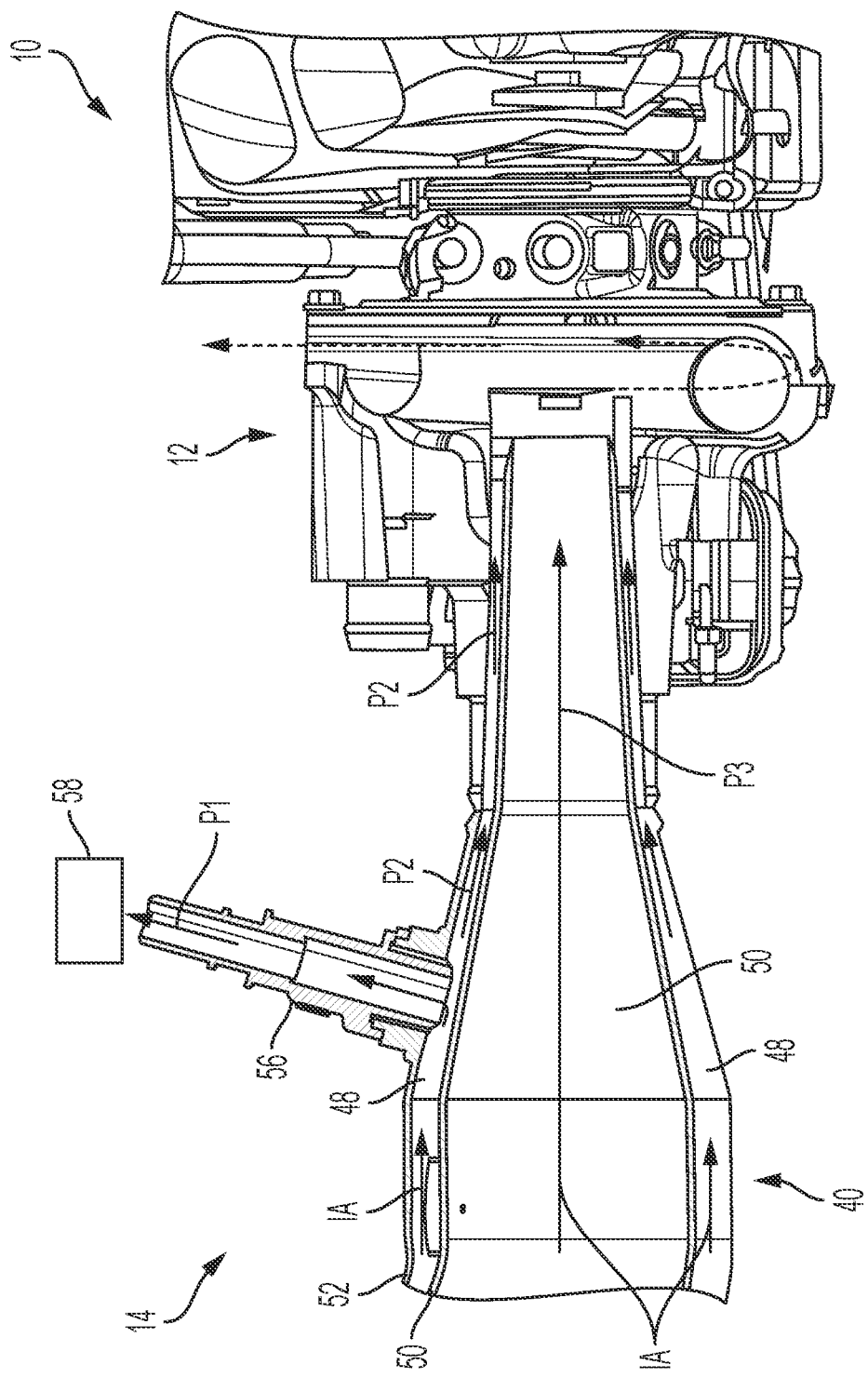
FIG. 5 is a sectional view of the turbocharger system shown in FIG. 2 during a high flow, low boost condition, in accordance with the principles of the present application.

With reference now to FIG. 5, one example operation of air induction system 10 in a high flow, low boost condition is illustrated. Intake air 'IA' enters the clean air box 54 and is drawn through both the inner passage 46 and the outer passage 48 toward the compressor inlet 22. A first portion 'P1' of the intake air directed through outer passage 48 is supplied through the port 56 toward the area 58, while a second portion 'P2' of the intake air is directed to the compressor inlet 22. A third portion 'P3' of the intake air is supplied through the inner passage 46 to the compressor inlet 22.

Described herein are systems and methods for turbocharger systems to control recirculation backflow. The turbocharger system includes a bifurcated clean air system fluidly coupled to a turbocharger. The bifurcated clean air system includes a bifurcated conduit defining an inner passage and an outer passage, which is fluidly coupled to engine dead space via an MUA port. Advantageously, the systems provide EVAP compliance by connecting recirculation backflow channels to main ducting, thereby providing potential recirculation to the clean air duct or airbox of the primary intake channel. Fuel purge port, MUA port, and air temperature sensors are located a predetermined distance from or proximity to the turbocharger compressor wheel or in one of the flow channels.

Further advantages include utilizing CCV or MUA ports to evacuate hot surging air into the engine dead space to provide a way to reject heat from the clean air duct without requiring a low temperature coolant or refrigerant based heat exchanger. Further, heat contamination is prevented by non-equivalent tube lengths to slow fresh, inner tube flow to not be easily heat contaminated by recirculation backflow directed back to the clean airbox. As such, a tortuous path is created for hot flow to facilitate preventing high amounts of hot air/cold air mixing. Hot compressor recirculation backflow that is bifurcated may eventually be reintroduced as incoming flow to the compressor wheel. A low temperature heat exchanger may be utilized on the air duct to cool down the hot recirculation backflow before it is introduced into the compressor.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An air induction system for a vehicle, the system comprising:
   a turbocharger having a compressor side inlet; and
   a bifurcated clean air intake system having a bifurcated conduit comprising:
   an upstream end configured to receive intake air;
   a downstream end configured to supply intake air to the compressor side inlet;
   an inner passage configured to supply intake air to the downstream end;
   an outer passage disposed about the inner passage and separated from the inner passage by an inner wall, the outer passage configured to selectively receive recirculation backflow from the compressor side inlet; and
   a port fluidly coupled between the outer passage and at least one of a crankcase and a valve cover of the vehicle, wherein the port is configured to selectively evacuate at least a portion of the recirculation backflow to the crankcase and/or the valve cover.

2. The system of claim 1, wherein the upstream end is fluidly coupled to a clean air box such that both the inner passage and the outer passage are fluidly coupled to the clean air box.

3. The system of claim 2, wherein the clean air box is a single clean air box.

4. The system of claim 2, wherein a first portion of the recirculation backflow is directed to the crankcase and/or the valve cover, and a second portion of the recirculation backflow is directed back to the clean air box for mixture with the intake air.

5. The system of claim 2, wherein during a low flow, low boost operating condition, a first portion of intake air is directed into the compressor side inlet, a second portion of intake air is the recirculation backflow and directed through the outer passage and through the port.

6. The system of claim 2, wherein during at least one of a low flow, high boost condition and a high flow, high boost condition, the intake air is directed through the inner passage into the compressor side inlet, and a flow of crankcase air is drawn through the port, into the outer passage, and subsequently supplied to the compressor side inlet.

7. The system of claim 6, wherein intake air is also drawn through the outer passage, mixes with the flow of crankcase air, and is supplied to the compressor inlet side.

8. The system of claim 2, wherein during a high flow, low boost condition, a first portion of intake air is directed through the inner passage into the compressor side inlet, a second portion of intake air is directed through the outer passage into the port, and a third portion of intake air is directed through the outer passage to the compressor side inlet.

9. The system of claim 1, further comprising one or more heat exchangers thermally coupled to the conduit and configured to cool recirculation backflow passing through the outer passage.

10. An air induction system for an internal combustion engine, the system comprising:
- a turbocharger having a compressor side inlet;
- a clean air box; and
- a bifurcated clean air intake system having a bifurcated conduit fluidly coupled between the turbocharger and the clean air box and comprising:
  - an upstream end configured to receive intake air from the clean air box;
  - a downstream end configured to supply intake air to the compressor side inlet;
  - an inner passage configured to supply intake air to the downstream end;
  - an outer passage disposed about the inner passage and separated from the inner passage by an inner wall, the outer passage configured to selectively receive recirculation backflow from the compressor side inlet; and
  - wherein the outer passage is fluidly coupled to the clean air box and configured to selectively provide at least a portion of the recirculation backflow to the clean air box for mixing with the intake air.

11. The system of claim 10, wherein the inner passage and the outer passage have non-equivalent lengths within the clean air box to reduce mixing of the recirculation backflow and the fresh intake air to reduce thermal contamination thereof.

12. The system of claim 10, wherein the bifurcated clean air intake system further includes a port fluidly coupled between the outer passage and another location of the vehicle, wherein the port is configured to selectively provide at least a portion of the recirculation backflow to the another location of the vehicle.

13. The system of claim 10, wherein the recirculation backflow is sealed within the engine system and not exhausted therefrom for compliance with emissions requirements.

14. An air induction system for an internal combustion engine, the system comprising:
- a turbocharger having a compressor side inlet;
- a clean air box; and
- a bifurcated clean air intake system having a conduit fluidly coupled between the turbocharger and the clean air box and comprising:
  - an upstream end configured to receive intake air from the clean air box;
  - a downstream end configured to supply intake air to the compressor side inlet;
  - an inner passage configured to supply intake air to the downstream end;
  - an outer passage disposed about the inner passage and separated from the inner passage by an inner wall, the outer passage configured to selectively receive recirculation backflow from the compressor side inlet;
  - a port fluidly coupled between the outer passage and at least one of a crankcase and a valve cover of the engine, wherein the port is configured to selectively provide at least a portion of the recirculation backflow to the crankcase and/or the valve cover; and
- wherein the outer passage is fluidly coupled to the clean air box and configured to selectively provide at least a portion of the recirculation backflow to the clean air box for mixing with the intake air.

* * * * *